United States Patent
Bennie et al.

(10) Patent No.: US 10,152,058 B2
(45) Date of Patent: Dec. 11, 2018

(54) VEHICLE VIRTUAL MAP

(71) Applicant: Ford Global Technologies, LLC, Dearborn, MI (US)

(72) Inventors: Brian Bennie, Sterling Heights, MI (US); Cynthia M. Neubecker, Westland, MI (US); Brad Ignaczak, Canton, MI (US); Adil Nizam Siddiqui, Farmington Hills, MI (US); Jonathan Diedrich, Carleton, MI (US); Somak Datta Gupta, Canton, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 34 days.

(21) Appl. No.: 15/332,876

(22) Filed: Oct. 24, 2016

(65) Prior Publication Data

US 2018/0113459 A1 Apr. 26, 2018

(51) Int. Cl.
*G05D 1/00* (2006.01)
*G05D 1/02* (2006.01)

(52) U.S. Cl.
CPC ......... *G05D 1/0088* (2013.01); *G05D 1/0223* (2013.01)

(58) Field of Classification Search
CPC .......................... G05D 1/0088; G05D 1/0223
USPC ......................................................... 701/23
See application file for complete search history.

(56) References Cited

U.S. PATENT DOCUMENTS

| | | |
|---|---|---|
| 8,199,028 B2 | 6/2012 | Priyantha |
| 8,253,590 B2 | 8/2012 | Hiroyuki |
| 9,076,341 B2 | 7/2015 | Junichiro |
| 9,079,587 B1 | 7/2015 | Rupp et al. |
| 2002/0198632 A1 | 12/2002 | Breed et al. |
| 2015/0023668 A1 | 1/2015 | Spaulding et al. |
| 2015/0100189 A1 | 4/2015 | Levasseur et al. |
| 2015/0158499 A1 | 6/2015 | Krishna |
| 2015/0200957 A1 | 7/2015 | Zhang et al. |
| 2017/0248963 A1* | 8/2017 | Levinson ............. G05D 1/0278 |

OTHER PUBLICATIONS

Vehicle- To- Infrastructure- {V2I}- Communications- for Safety-http://www.its.dot.gov/research_archives/safety/v2i_comm_progress.html.
Search Report dated Apr. 19, 2018 for Great Britain Patent Application No. GB 1717172.9 (5 Pages).

* cited by examiner

*Primary Examiner* — Brian P Sweeney
(74) *Attorney, Agent, or Firm* — James P. Muraff; Neal, Gerber & Eisenberg LLP

(57) ABSTRACT

A vehicle includes: motor(s), local sensors, processor(s) configured to: generate a virtual map based on the local sensors; receive a plurality of reports from a plurality of external entities, statistically compare the plurality of reports, and identify an outlying report based on the statistical comparison; instruct the external entity responsible for the outlying report to mark future reports; ignore marked reports; generate the virtual map based on unmarked reports; reallocate virtual map processing resources based on unmarked reports.

20 Claims, 7 Drawing Sheets

VEHICLE VIRTUAL MAP

TECHNICAL FIELD

This disclosure relates to generation and application of vehicle grids.

BACKGROUND

Autonomous vehicles rely on sensed properties about (a) the instant vehicle, (b) other autonomous vehicles, (c) other non-autonomous (i.e., standard) vehicles, and (d) the environment. A solution is needed to efficiently compile these sensed properties and deliver the compilation to the autonomous vehicle.

SUMMARY

A vehicle includes: motor(s), local sensors, processor(s) configured to: generate a virtual map based on the local sensors and a report from an external entity; reallocate virtual map processing resources based on the report.

According to some embodiments, the processor(s) are configured to reallocate virtual map processing resources by reducing processing resources dedicated to certain geographical areas of the virtual map, the certain geographical areas being determined based on the report.

According to some embodiments, the processor(s) are configured to control the motor(s) based on the virtual map.

According to some embodiments, the processor(s) are configured to dedicate first processing resources to generating at least a portion of the virtual map from the local sensors, and, based on receipt of the report, dedicate second processing resources to generating the at least a portion of the virtual map from the local sensors.

According to some embodiments, the first processing resources exceed the second processing resources.

According to some embodiments, the processing resources comprise a generation frequency, such that when applying the first processing resources, the processor(s) generate the at least a portion of the virtual map at a first frequency and when applying the second processing resources, the processor(s) generate the at least a portion of the virtual map at a second, lower frequency.

According to some embodiments, the report comprises coordinates of a zone and a rule of the zone.

According to some embodiments, the rule of the zone is a maximum acceleration and the processor(s) are configured to control the motors based on the maximum acceleration.

According to some embodiments, the vehicle includes steering, and the rule of the zone is forbidden steering maneuver and the processor(s) are configured to prevent the steering from executing the forbidden steering maneuver when the vehicle is detected to be in the zone.

According to some embodiments, the processor(s) are configured to: enable the forbidden steering maneuver when the vehicle is detected to be outside of the zone.

According to some embodiments, the report comprises a marked unit and wherein the processor(s) are configured to: detect the mark and based on the detection, ignore the unit.

According to some embodiments, the report comprises an unmarked unit and wherein the processor(s) are configured to generate the virtual map based on the unmarked unit.

According to some embodiments, the processor(s) are configured to: receive a plurality of reports from a plurality of external entities, statistically compare the plurality of reports, and identify an outlying report based on the statistical comparison.

According to some embodiments, the processor(s) are configured to: compare timestamps of the plurality of reports and select reports for the statistical comparison based on the comparison of the timestamps.

According to some embodiments, the processor(s) are configured to: instruct the external entity responsible for the outlying report to mark future reports.

According to some embodiments, the processor(s) are configured to: ignore marked reports.

According to some embodiments, the statistical comparison of the plurality of reports comprises statistical comparison of only selected portions of the plurality of reports.

According to some embodiments, the report comprises a marking frequency and the processor(s) are configured to generate the virtual map based on the marking frequency.

A vehicle includes: motor(s), local sensors, processor(s) configured to: generate a virtual map based on the local sensors; receive a plurality of reports from a plurality of external entities, statistically compare the plurality of reports, and identify an outlying report based on the statistical comparison; instruct the external entity responsible for the outlying report to mark future reports; ignore marked reports; generate the virtual map based on unmarked reports.

A vehicle includes: motor(s), local sensors, processor(s) configured to: generate a virtual map based on the local sensors; receive a plurality of reports from a plurality of external entities, statistically compare the plurality of reports, and identify an outlying report based on the statistical comparison; instruct the external entity responsible for the outlying report to mark future reports; ignore marked reports; generate the virtual map based on unmarked reports; reallocate virtual map processing resources based on unmarked reports.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
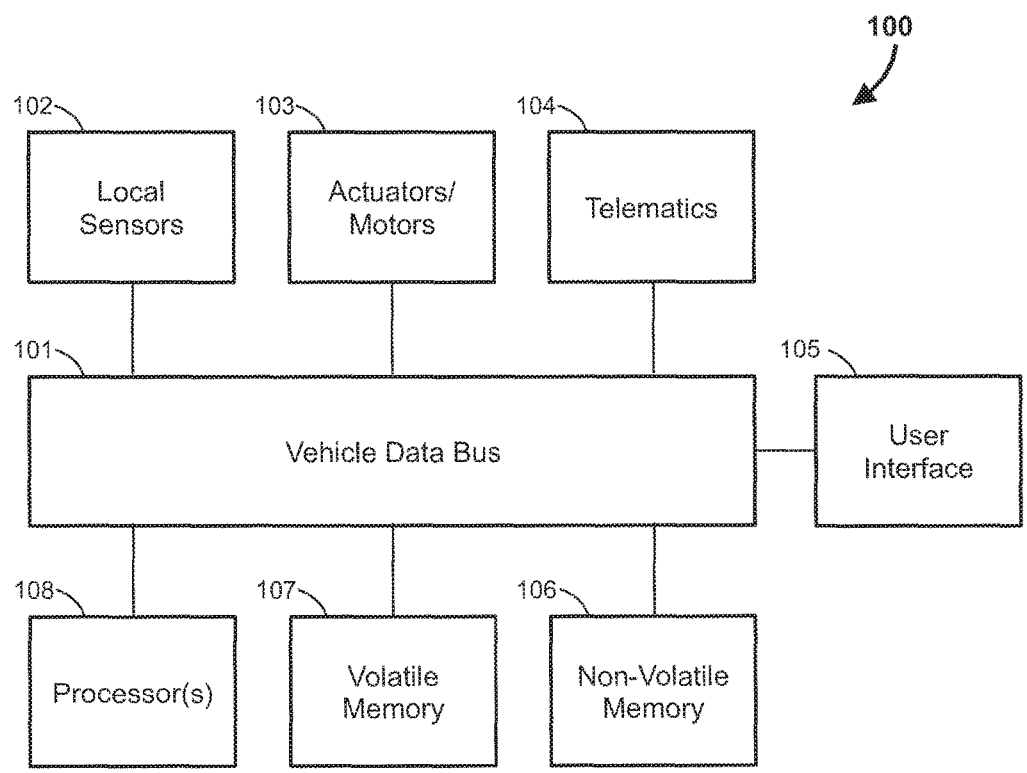
FIG. 1 is a block diagram of a vehicle computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present, as one option, and mutually exclusive alternatives as another option. In other words, the conjunction "or" should be understood to include "and/or" as one option and "either/or" as another option.

FIG. 1 shows a computing system 100 of first vehicle 200. First vehicle 200 is connected, meaning that first vehicle 200 is configured to suggest or implement driving maneuvers based on information received from external sources (e.g., connected infrastructure 301, other connected vehicles 201, the Internet, etc). First vehicle 200 may be autonomous or semi-autonomous. First vehicle 200 includes a motor, a battery, at least one wheel driven by the motor, and a steering system configured to turn the at least one wheel about an axis. First vehicle 200 may be fossil fuel powered (e.g., diesel, gasoline, natural gas), hybrid-electric, fully electric, fuel cell powered, etc.

Vehicles are described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie"), and U.S. patent application Ser. No. 14/972,761 to Hu et al. ("Hu"), all of which are hereby incorporated by reference in their entireties. First vehicle 200 may include any of the features described in Miller, Prasad, Lavoie, and Hu.

Computing system 100 resides in first vehicle 200. Computing system 100, among other things, enables automatic control of mechanical systems within first vehicle 200 and facilitates communication between first vehicle 200 and external entities (e.g., connected infrastructure 301, the Internet, other connected vehicles 201). Computing system 100 includes a data bus 101, one or more processors 108, volatile memory 107, non-volatile memory 106, user interfaces 105, a telematics unit 104, actuators and motors 103, and local sensors 102.

Data bus 101 traffics electronic signals or data between the electronic components. Processor 108 performs operations on electronic signals or data to produce modified electronic signals or data. Volatile memory 107 stores data for near-immediate recall by processor 108. Non-volatile memory 106 stores data for recall to the volatile memory 107 and/or the processor 108. Non-volatile memory 106 includes a range of non-volatile memories including hard drives, SSDs, DVDs, Blu-Rays, etc. User interface 105 includes displays, touch-screen displays, keyboards, buttons, and other devices that enable user interaction with the computing system. Telematics unit 104 enables both wired and wireless communication with external entities via Bluetooth, cellular data (e.g., 3G, LTE), USB, etc.

Actuators/motors 103 produce tangible results. Examples of actuators/motors 103 include fuel injectors, windshield wipers, brake light circuits, transmissions, airbags, engines, power train motors, steering, etc. Local sensors 102 transmit digital readings or measurements to processors 108. Examples of local sensors 102 include temperature sensors, rotation sensors, seatbelt sensors, speed sensors, cameras, lidar sensors, radar sensors, infrared sensors, ultrasonic sensors etc. It should be appreciated that any of the various electronic components of FIG. 1 may include separate or dedicated processors and memory. Further detail of the structure and operations of computing system 100 is described, for example, in Miller, Prasad, Lavoie, and Hu.

Figure 2:
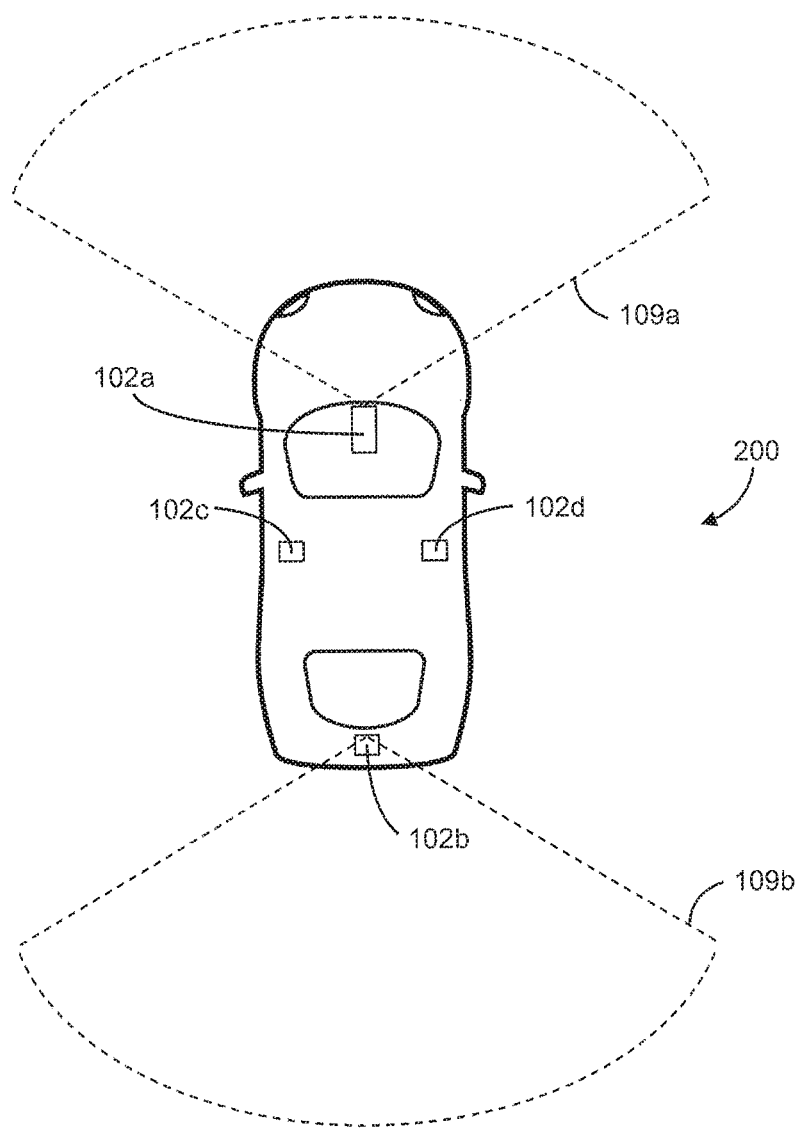
FIG. 2 is a top plan view of a vehicle including the vehicle computing system.

FIG. 2 generally shows and illustrates first vehicle 200, which includes computing system 100. Some of the local sensors 102 are mounted on an exterior of first vehicle 200 (others are located inside the vehicle 200). Local sensor 102a is configured to detect objects leading the vehicle 200. Local sensor 102b is configured to detect objects trailing the vehicle 200 as indicated by trailing sensing range 109b. Left sensor 102c and right sensor 102d are configured to perform similar functions for the left and right sides of the vehicle 200.

As previously discussed, local sensors 102a to 102d may be ultrasonic sensors, lidar sensors, radar sensors, infrared sensors, cameras, microphones, and any combination thereof, etc. First vehicle 200 includes a host of other local sensors 102 located in the vehicle interior or on the vehicle exterior. Local sensors 102 may include any or all of the sensors disclosed in Miller, Prasad, Lavoie, and Hu.

It should be appreciated that first vehicle 200 is configured to perform the methods and operations described herein. In some cases, first vehicle 200 is configured to perform these functions via computer programs stored on volatile 107 and/or non-volatile 106 memories of computing system 100.

A processor is "configured to" perform a disclosed method step or block at least when the processor is in operative communication with memory storing a software program with code or instructions embodying the disclosed method step or block. Further description of how processors, memory, and software cooperate appears in Prasad. According to some embodiments, a mobile phone or an external server in operative communication with first vehicle 200 perform some or all of the methods and operations discussed below.

According to various embodiments, first vehicle 200 includes some or all of the features of vehicle 100a of Prasad. According to various embodiments, computing system 100 includes some or all of the features of VCCS 102 of FIG. 2 of Prasad. According to various embodiments, first vehicle 200 is in communication with some or all of the devices shown in FIG. 1 of Prasad, including nomadic device 110, communication tower 116, telecom network 118, Internet 120, and data processing center 122.

The term "loaded vehicle," when used in the claims, is hereby defined to mean: "a vehicle including: a motor, a plurality of wheels, a power source, and a steering system; wherein the motor transmits torque to at least one of the plurality of wheels, thereby driving the at least one of the plurality of wheels; wherein the power source supplies energy to the motor; and wherein the steering system is configured to steer at least one of the plurality of wheels." The term "equipped electric vehicle," when used in the claims, is hereby defined to mean "a vehicle including: a battery, a plurality of wheels, a motor, a steering system; wherein the motor transmits torque to at least one of the plurality of wheels, thereby driving the at least one of the plurality of wheels; wherein the battery is rechargeable and is configured to supply electric energy to the motor, thereby driving the motor; and wherein the steering system is configured to steer at least one of the plurality of wheels."

Each of the external entities described in this application (e.g., the connected infrastructure, the other autonomous vehicles, mobile phones, servers) may share any or all of the features described with reference to FIGS. 1 and 2.

Figure 3:
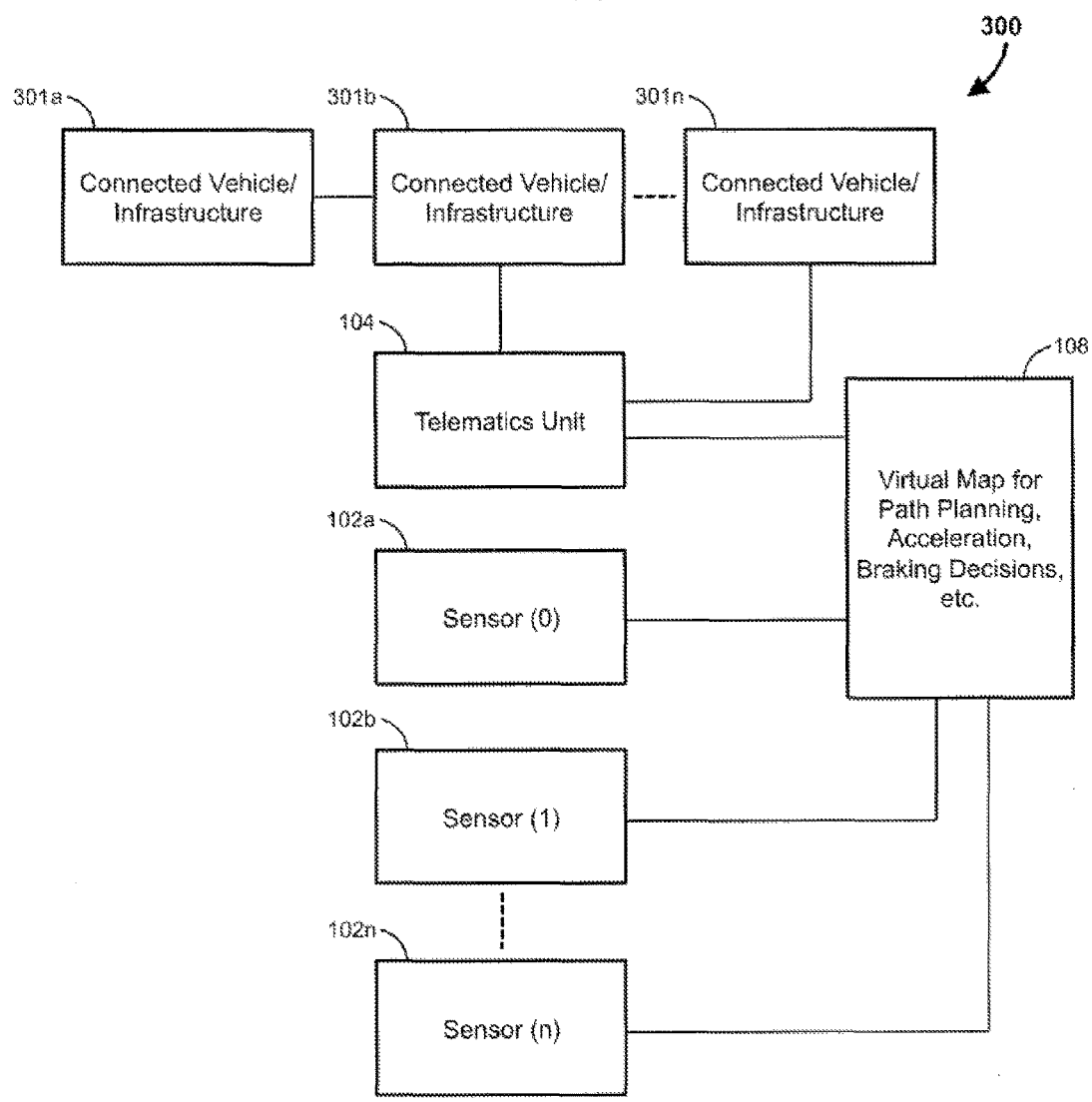
FIG. 3 is a block diagram of communication between the vehicle computing system and external entities such as infrastructure or vehicles.
Figure 4:
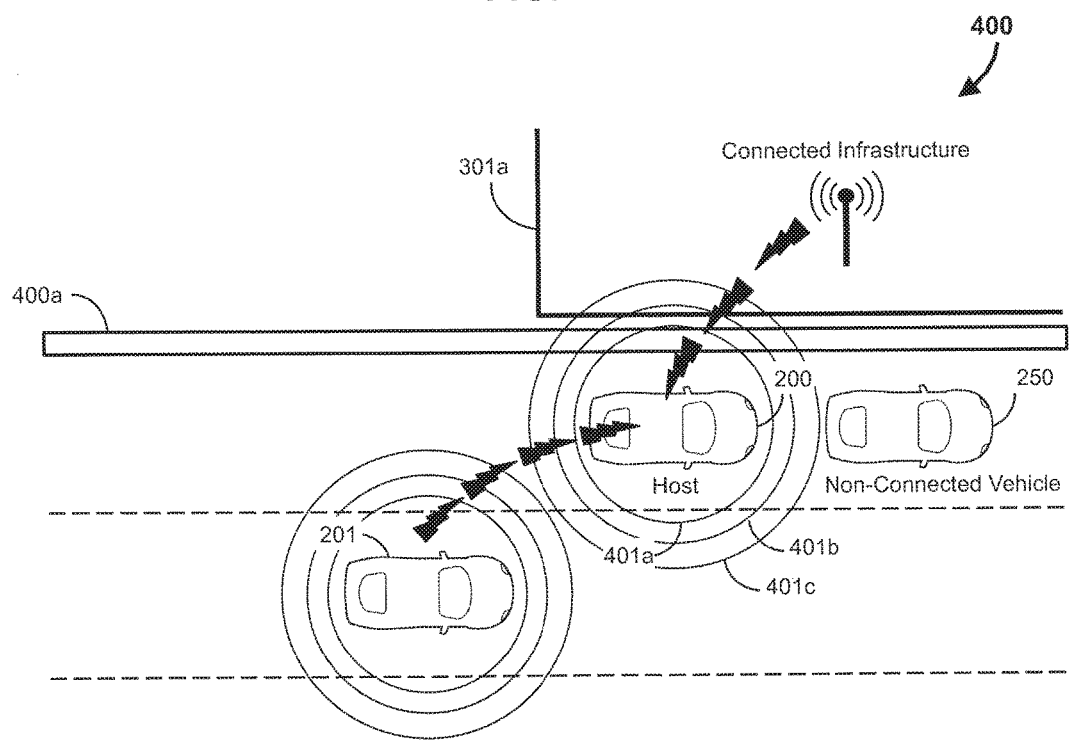
FIG. 4 is a top plan view of an environment.
Figure 5:
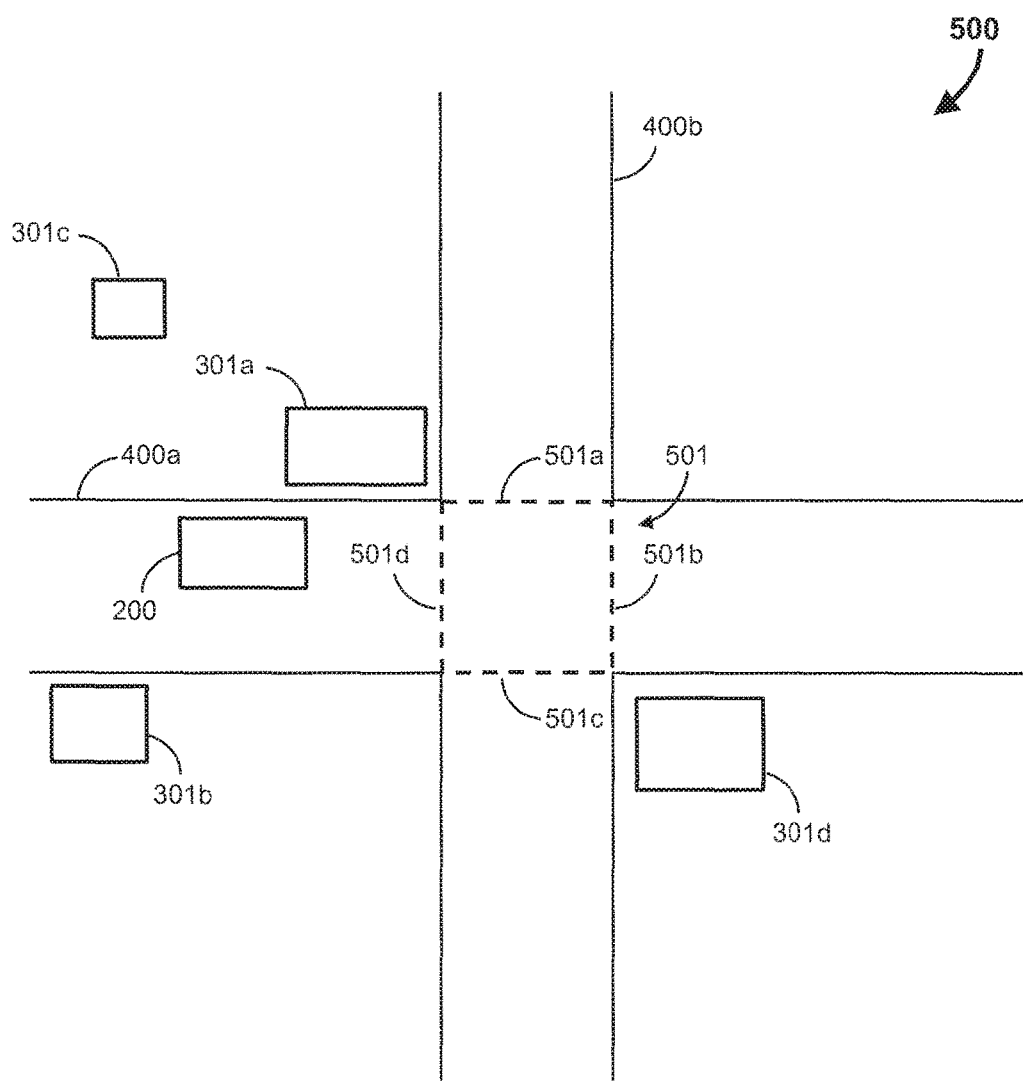
FIG. 5 is an expanded top plan view of the environment with some vehicles omitted.

With reference to FIGS. 3, 4, and 5, first vehicle 200 receives external reports 301a to 301n via telematics 104. The reports may be raw sensor data and/or results of an analysis of raw sensor data (the analysis being performed at the external entity). The sensors may be mounted on infrastructure (e.g., buildings or street lamps). The sensors may be mounted on other autonomous vehicles. External reports 301a to 301n may be trafficked via kind of wireless signal (e.g., DSRC, Bluetooth, WiFi, cellular). External reports 301a to 301n may be embodied in packets transmitted over the Internet or the external reports 301a to 301n may be directly transmitted to first vehicle 200 without passing through the Internet (e.g., via DSRC). Information included in reports 301 is discussed below with reference to FIG. 7.

As previously stated, first vehicle 200 includes local sensors 102. Local sensors 102 report measurements to processors 108. As described below, processors 108 analyze the measurements. Processors 108 build a 2D or 3D virtual map based on the measurements. It should be appreciated that external reports 301 may include different information than reported by the local sensors 102.

Processors 108 apply reports 301 and the measurements or readings from local sensors 102 to generate instructions. Processors 108 control actuators/motors 103 based on reports 301 and readings from local sensors 102. If first vehicle 200 is autonomous, then processors 108 drive (e.g., steer, accelerate, brake) first vehicle 200.

First vehicle 200 may save some of the instructions in memory 106, 107. First vehicle 200 may transmit some of the instructions via telematics unit 104 to external devices. The instructions are not necessarily driving commands. The instructions may cause first vehicle 200 or an external entity to store information (e.g., infrastructure sensor X is miscalibrated) in memory.

As stated above, processors 108 build a virtual map of the environment in relation to first vehicle 200. The virtual map includes road properties (e.g., direction of travel, surface characteristics, location of fixed obstacles), external vehicle properties (e.g., location, velocity, acceleration, size), infrastructure properties (e.g., location, size), and environmental properties (e.g., population density, temperature). Preloaded autonomous driving software or programs drive first vehicle 200 (when first vehicle is autonomous) based on the virtual map. It should be appreciated that the virtual map need not be displayed and/or displayable. The virtual map may be embodied as a series of objects with associated properties, stored in memory.

FIG. 4 is a top view of an environment 400. First vehicle 200, a second vehicle 201, and a third vehicle 250 are traversing a first road 400a. Second vehicle 201 is connected and similar to first vehicle 200. Third vehicle 250 is a standard or non-connected vehicle. First infrastructure 301a (e.g., an office building) is to the left of the road 400a. Second infrastructure 301b (e.g., an office building or a street lamp) is to the right of the road 400a.

FIG. 5 is an expanded top view of the environment 400. FIG. 5 omits second and third vehicles 201, 250. First road 400a crosses second road 400b at an intersection 501. Third infrastructure 301c is to the left of the road 400a and is a greater distance from road 400a than first infrastructure 301a. Fourth infrastructure 301d, similar to the first infrastructure 301a, is adjacent the intersection 501. Each piece of infrastructure 301 is configured to broadcast (e.g., via the Internet or via DSRC) information. Each piece of infrastructure 301 is therefore connected. As previously stated, each piece of infrastructure 301 may include sensors. Readings from the sensors (whether raw or analyzed/processed) are included in reports 700. Some pieces of infrastructure 301 may lack sensors and be configured to broadcast pieces of information stored in memory.

As shown in FIG. 4, first vehicle 200 includes a plurality of sensing zones 401a to 401c. Second vehicle 201, being similar to first vehicle 200, includes similar zones. Generally, first vehicle 200 prioritizes quality and accurate sensing (and thus virtual mapping) of environment falling within zones closest to first vehicle 200.

For example, first vehicle 200 assigns a highest priority to sensing and mapping of environment within first zone 401a, a second highest priority to sensing and mapping within second zone 401b, and a third highest priority to sensing and mapping within third zone 401c. First vehicle 200 may prioritize a zone by: dedicating extra processing resources to the zone, increasing frequency of local sensor measurements within the zone, and/or dedicating a greater number of local sensors to conducting measurements of the zone, etc. Put differently, first vehicle 200 prioritizes constructing an accurate virtual map of environment immediately surrounding first vehicle 200 and deprioritizes accurate mapping of environment distant from first vehicle 200. A perimeter of third zone 401c may represent a maximum sensing range of first vehicle 200. Zones 401 may be elliptical or oval-shaped with a major axis of the oval or ellipse extending parallel to a major longitudinal axis of first vehicle 200.

The above-discussed external reports 700 improve the quality of the virtual map of first vehicle 200. First, external reports may map environment located outside of the sensing range of first vehicle 200. Second, external reports may include information related to environment within the sensing range of first vehicle 200, thus enabling first vehicle 200 to reduce processing and/or sensing resources of that portion of the environment. According to some embodiments, first vehicle 200 relies on local sensors 102 to map environment within zones 401 and on external sensors (i.e., sensors mounted on external entities) to map environment outside of zones 401.

As a quality of the virtual map increases, first vehicle 200 (when at least semi-autonomous) may enable certain driving techniques (e.g., higher speed, performing U-turns) that are otherwise disabled. The quality of the virtual map may increase as (a) more environment is represented in the virtual map and/or (b) environment represented in the virtual map is updated at a greater frequency. For example, and with reference to FIG. 5, first vehicle 200 may decline to execute a U-turn unless first vehicle 200 is aware of the position and velocity of each vehicle a predetermined distance away from intersection 501, the expected area of the U-turn, and/or the current position of first vehicle 200.

Figure 7:
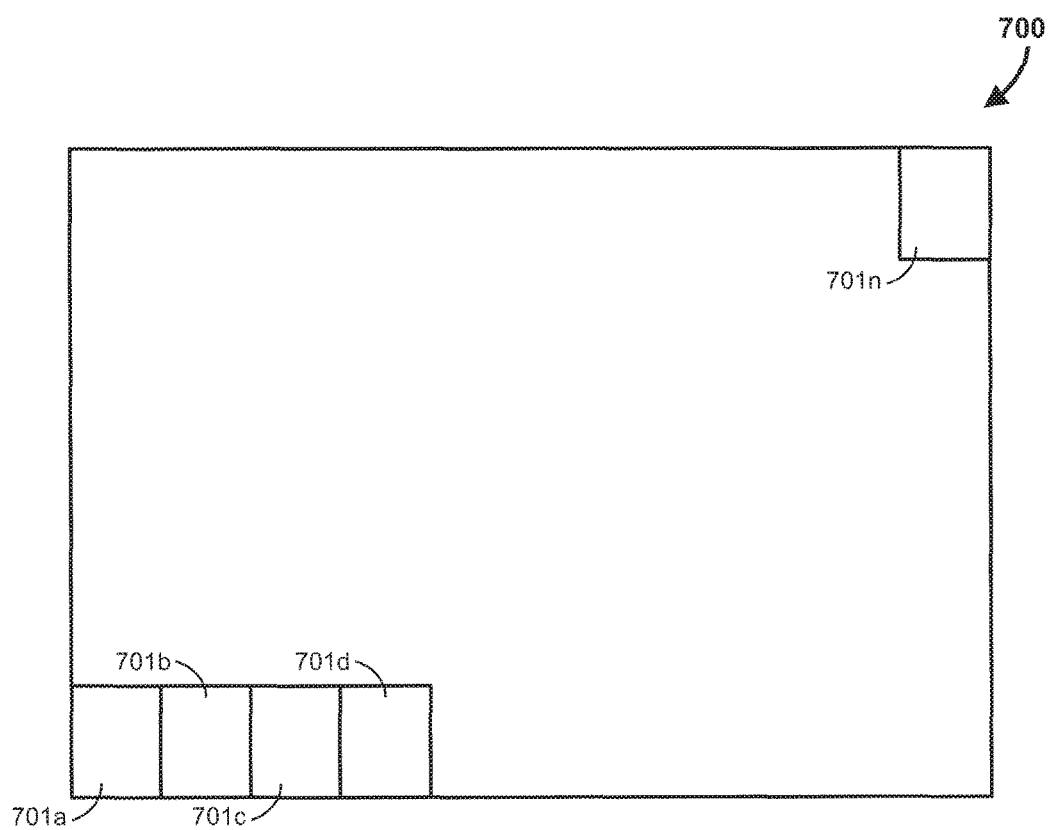
FIG. 7 is a block diagram of a report.

FIG. 7 represents a report 700 generated by a piece of connected infrastructure 301 and/or second vehicle 201. Report 700 includes units 701a to 701n of information. Each external entity may generate a different report 700 with different units 701 of information. Units 701 need not be simultaneously transmitted in a single report 700. Put differently, report 700 may represent a combination of multiple different reports 700. Units 701 may be broken down into sub-units. Each of the sub-units can be considered to be a unit 701. Units may be categorized.

Reports 700 generated by connected infrastructure 301 may include some or all of the following categories of units 701: (a) static 2D or 3D dimensions and coordinates of infrastructure; (b) static or variable 2D or 3D dimensions of one or more buffer zones along with properties of the buffer or keep-out zones; (c) static and/or variable properties of environment; (d) static and/or variable properties of road; (e)

static and/or variable properties of detected vehicles (standard and connected); (f) static and/or variable properties of pedestrians; (g) accuracy markings. First vehicle 200 may supplement the virtual map with any or all of these properties (thus enhancing quality of the map).

With respect to category (a), infrastructure 301 may be preprogrammed with an outer perimeter of the infrastructure. Infrastructure 301 may be programmed with outer perimeters of multiple pieces of infrastructure. For example, infrastructure 301*a* may report outer perimeter of infrastructure 301*a*, 301*b*, and 301*d*.

With respect to category (b), infrastructure 301 may be preprogrammed with one or more buffer zones. Although infrastructure 301 may not physically occupy the buffer zones, the buffer zones represent area where a connected vehicle should perform in some unusual or atypical way. Put differently, buffer zones may include rules.

Buffer zones may represent areas that first vehicle 200 is not allowed to occupy. Buffer zones may represent areas that first vehicle 200 may occupy, but at a reduced maximum speed and/or a reduced maximum acceleration. For example, infrastructure may enforce a reduced speed limit in a perimeter of a parking lot or a driveway. Buffer zones may cause first vehicle 200 to enhance update frequency and/or accuracy its virtual map. For example, infrastructure 301 may require first vehicle 200 to update the virtual map at least a predetermined number of times per second. Such a feature would be valuable, for example, in areas with a large pedestrian density, such as a parking lot. Buffer zones may cause first vehicle 200 to transition from one mode of operation (e.g., autonomous driving mode) to another mode of operation (e.g., manual driving mode). Buffer zones may restrict the kinds of driving maneuvers available to first vehicle 200.

Infrastructure 301 may be configured to vary the coordinates of the buffer zones and/or the properties associated with the buffer zones based on any number of factors (e.g., time of day, day of week). Infrastructure 301 may be configured to vary the coordinates of the buffer zones and/or the associated properties based on measurements conducted by the infrastructure (e.g., volume of people badging into the infrastructure per minute, volume of elevator usage, volume of check-outs performed at cash registers, density of people detected in one or more areas by sensors mounted on the infrastructure, number of parking spots open). Each buffer zone may include one or more of the above features.

First vehicle 200 may be configured to ignore some or all of the properties of buffer zones. For example, first vehicle 200 may be configured to ignore or disregard portions of any buffer zone that intrudes onto public road. First vehicle 200 may determine dimensions of public road with reference to local sensors 102 and/or received coordinates (e.g., a server with a map of public roads).

With respect to category (c), infrastructure 301 may transmit environmental properties, such as temperature, pressure, humidity, etc. With respect to category (d), the infrastructure may transmit road properties (e.g., pothole coordinates, speed limits, frictional road surface coefficients.)

With respect to category (e), infrastructure 301 may transmit properties of vehicles detected via infrastructure sensors. Infrastructure 301 may identify properties of these vehicles (e.g., location, velocity, acceleration, make, model, size). Infrastructure 301 may further identify whether detected vehicles are autonomous (and if autonomous, the level of autonomy) or standard. Infrastructure may make such a determination via responses to queries sent to identified vehicles.

With respect to category (f), infrastructure 301 may estimate pedestrian density within a certain area (e.g., one of the buffer zones). Infrastructure 301 may perform such an estimation with the above-described proxy techniques (e.g., volume of badge-ins), by counting the number of people in or around the infrastructure (e.g., via sensors), or with a preprogrammed algorithm based on a current time and day (e.g., weekdays from 8 am to 7 pm the pedestrian density is always estimated to be high).

Category (f) functions similar to a buffer zone and may be embodied as a buffer zone. Any of the above information may be embodied as a buffer zone.

As previously discussed, first vehicle 200 may adjust autonomous driving techniques based on the virtual map. The virtual map (except as discussed below with reference to marked categories) is updated based on reports 700 and units 701 contained therein. For example, first vehicle 200 may adjust its current speed, maximum speed, current acceleration, maximum acceleration, frequency of virtual map update, and/or kinds of driving maneuvers (e.g., U-turns) based on any of the above-described features or the virtual map.

With respect to unit (g), infrastructure 301 may associate confidence or accuracy with any of the above-described units 701 or categories thereof. The confidence or accuracy is embodied in a mark. The mark may be a result of analysis performed by infrastructure 301, a connected vehicle, a remote server, or any other connected entity.

Figure 6:
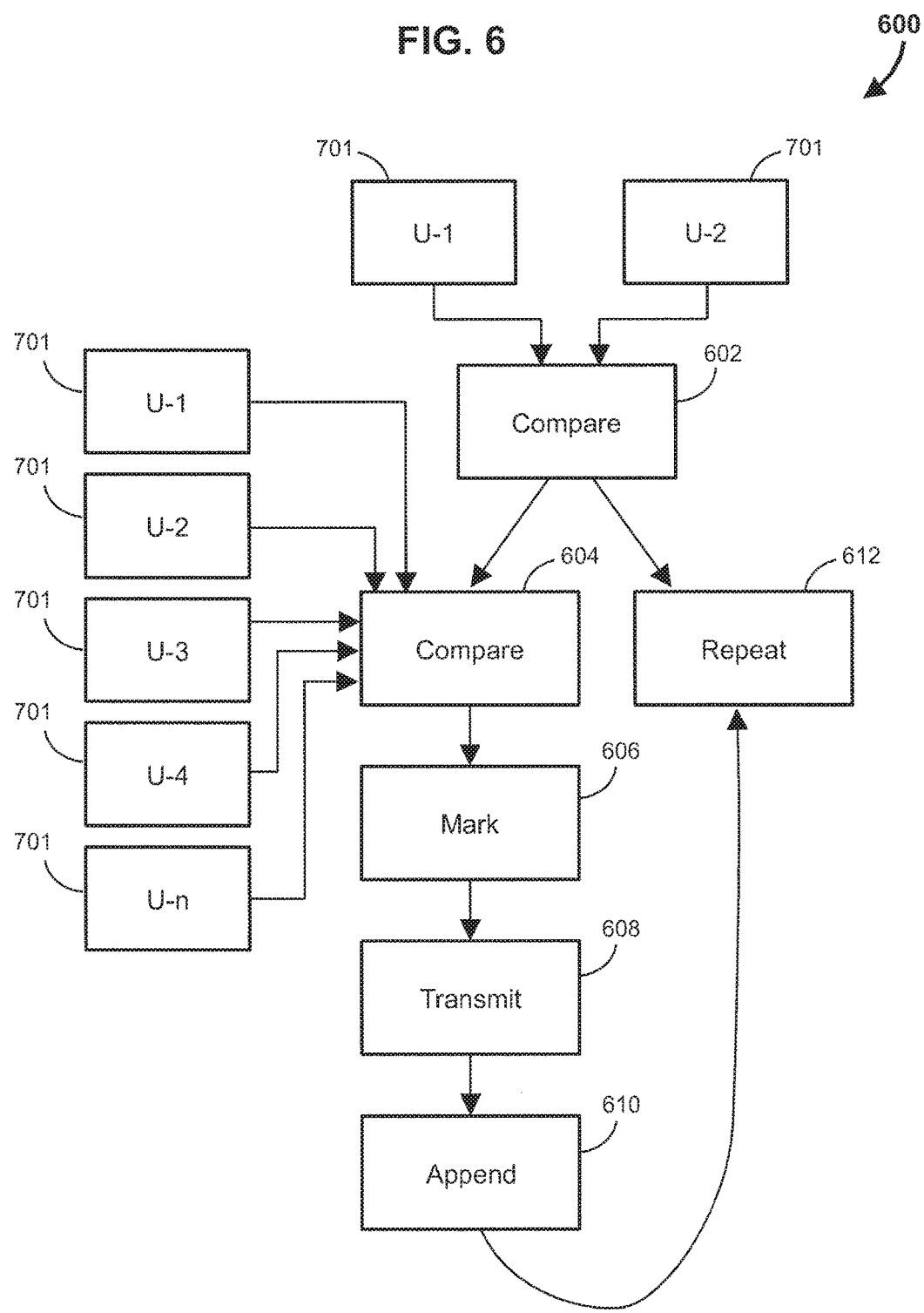
FIG. 6 is a block diagram of a method.

A method 600 of performing the mark analysis is shown in FIG. 6. As previously stated, any entity (e.g., connected infrastructure, a remote server, an autonomous vehicle) may perform method 600. In the example below, first vehicle 200 performs method 600.

As an overview, method 600 compares units 701 generated by different entities, marks outlying units and categories associated with the outlying units, and then causes: (a) connected vehicles to discard or ignore future units 701 transmitted from the responsible entity and falling within the marked category and/or (b) the responsible entity to append a low confidence indicator to each unit 701 associated with the marked category.

For clarity (and not by way of limitation): (a) each unit 701 falls within a predetermined unit category; (b) each report 700 may include multiple categories of units 701; (c) a marked unit 701 is an outlying or incorrect measurement; (d) a marked category is the category associated with the marked unit 701; (e) a marked category may include a binary mark or may include a mark frequency (i.e., frequency of units 701 within the category being marked) and/or a mark magnitude (e.g., an average magnitude of error of marked units 701); (f) when a category of an entity is marked, all units related to that category and transmitted from the entity are marked; (g) a responsible entity is the entity responsible for transmitting a marked unit.

At block 602 first vehicle compares a plurality of units 701, generated by different entities or different sensors within the same entity. In this example, unit u-1 is generated by first vehicle 200. Unit u-2 is generated by infrastructure 301*a*. At block 602, first vehicle 200 determines whether the compared units match to a predetermined degree or mismatch by more than the predetermined degree (the term "match" as applied herein contemplates matching within a predetermined degree).

For example, at block 602 first vehicle 200 may compare speed of second vehicle 201 determined by first vehicle 200 with speed of second vehicle 201 determined by infrastructure 301a. Because speed of second vehicle 201 varies with time, timestamp of unit 701 generated by first vehicle 200 should match (within a predetermined degree) timestamp of unit 701 generated by infrastructure 301a. When units 701 are not time dependent (e.g., dimensions of infrastructure as opposed to speed of a vehicle), timestamps may be ignored and/or the predetermined degree may be increased. Relevance of timestamps and the predetermined matching degrees of timestamps may vary with category.

If the compared units match, then a new comparison is performed at block 612 (i.e., method 600 repeats with different units 701). If the compared units mismatch, then first vehicle 200 proceeds to block 604.

At block 604, first vehicle 200 considers additional units 701 recorded by other entities. Unit u-3 may be generated by second vehicle 201. Unit u-4 may be generated by infrastructure 301d. If the unit under comparison is time-dependent, then: (a) the additional units should have a timestamp matching the timestamp of the units considered during block 602 (this means that either first vehicle 200 received and saved the additional units and/or the other entities are configured to store previous units and transmit the previous units in response to a query); or (b) first vehicle 200 receives updated measurements from each entity (i.e., first vehicle 200 receives updated u-1 and u-2 such the timestamps of u-1 to u-n match).

At block 604, first vehicle 200 compares u-1, u-2, u-3, u-4 . . . u-n. First vehicle 200 performs a statistical analysis on the compared units to find outliers. At block 606, first vehicle 200 marks the outliers (there may be one or zero outliers). For example, first vehicle 200 may average the units 701, find a standard deviation, then mark units 701 falling outside the standard deviation as being outliers. Other statistical algorithms are suitable. If there are zero outliers, then the method 600 proceeds to block 612.

First vehicle 200 saves the marks in memory 106, 107. Given a marked outlier, first vehicle 200 may (a) ignore all reports being generated by the entity responsible for the marked outlier, (b) ignore portions of reports (e.g., multiple categories) generated by the responsible entity, or (c) only ignore units 701 transmitted from the responsible entity falling in the same category as the marked outlier (e.g., velocity of vehicles). As discussed below, first vehicle 200 may additionally consider a marking frequency and/or a marking magnitude of a category when determining whether to ignore the category or the reports from the responsible entity.

It follows that each entity, including first vehicle 200, is configured to categorize units 701 (e.g., category 1: velocity measurements of vehicles; category 2: positions of vehicles; category 3: temperature, etc.). According to some embodiments, each unit 701 may be marked with a category prior to wireless transmission. According to some embodiments, entities are configured to re-categorize units 701 according to local software (e.g., infrastructure 301a categorizes unit 701 as falling in category 1, but first vehicle recategorizes unit 701 as falling in category 2 or both of categories 1 and 2).

At block 608, first vehicle 200 transmits the marks and/or the identities of the marked categories (along with the identity of the responsible entity) to connected entities. The connected entities (e.g., second vehicle 201) may perform some or all of the same functions as first vehicle 200 in response to the marks. The marks may include a magnitude of the error.

According to some embodiments, connected entities receiving the identity of a responsible entity skip block 608 to avoid redundancy. According to some embodiments, connected entities periodically update a centralized server with responsible entities, marked categories (which may include a marking frequency or marking magnitude), and/or marked units 701. The update may occur at a predetermined frequency and/or upon detecting a new responsible entity.

According to these embodiments, connected entities periodically query the centralized server and download the identities of the responsible entities, the marked categories and/or marked units. According to some embodiments, connected entities query the centralized server for only relevant responsible entities (e.g., only responsible entities falling within a predetermined range of a current location of the querying entity or within a predetermined range of a route of the querying entity). According to some embodiments, the centralized server determines the marking frequency and/or the marking magnitude of a responsible entity based on a plurality of uploads from a plurality of entities.

At block 610, the responsible entity appends a low confidence indicator to at least units 701 in the same category as the marked outlier (e.g., all units 701 related to vehicle velocities). Put differently, the responsible entity marks the category associated with the marked outlying unit 701. Future units 701 in the same category (i.e., the marked category) transmitted by the responsible entity include the low confidence indicator. According to some embodiments, entities are configured to include, in the low confidence indicator, a frequency that units 701 falling within a certain category are marked (i.e., a marking frequency). According to some embodiments, entities are configured to append a marking magnitude (e.g., an average magnitude) of marked units 701 falling within a certain category.

Thus, vehicles may be configured to ignore or discard units 701 that are appended with a low confidence indicator (i.e., units associated with a marked category). Vehicles may be configured to ignore or discard units 701 associated with categories exceeding a predetermined threshold marking frequency. The predetermined threshold marking frequency may change across categories (e.g., temperature category has a high threshold frequency, whereas vehicle position has a low threshold frequency).

The responsible entity may generate a repair alert in response to a marked unit, category, and/or a category exceeding a predetermined marking frequency. The repair alert may be displayed on a user-interface (e.g., a display screen). After block 610, the method proceeds to block 612 (described above).

Blocks 602 and 604 may be collapsed into a single block where first vehicle 200 initially compares more than two units 701 and runs the statistical outlier algorithm on the initial comparison.

Connected entities may be configured to end broadcast of marked categories exceeding a certain marking frequency or marking magnitude. Connected entities may be configured to initiate method 600. For example, when a connected entity has a marked category (or a category exceeding a predetermined marking frequency), then the connected entity may automatically and periodically request (or increase the frequency of requests) that other entities confirm the category mark. If a repeat of method 600 fails to arrive at the same conclusion, then the connected entity may remove the category mark. Additionally, connected entities with at least one category mark may be configured to automatically and periodically request (or increase the frequency of requests) for analysis of categories distinct from the marked category. For example, entities may assume that if a vehicle position category is marked, then a vehicle velocity category may also be flawed.

The invention claimed is:

1. A vehicle comprising:
   steering;
   motors;
   local sensors; and
   processors configured to:
   execute, via the motors and the steering, a plurality of driving maneuvers;
   generate a virtual map based on the local sensors and a report from an external entity; and
   based on the report:
   reallocate virtual map processing resources; and
   restrict at least one of the plurality of driving maneuvers.

2. The vehicle of claim 1, wherein the processors are configured to reallocate virtual map processing resources by reducing processing resources dedicated to certain geographical areas of the virtual map, the certain geographical areas being determined based on the report.

3. The vehicle of claim 2, wherein the processors are configured to control the motors based on the virtual map.

4. The vehicle of claim 1, wherein the processors are configured to dedicate first processing resources to generating at least a portion of the virtual map from the local sensors, and, based on receipt of the report, dedicate second processing resources to generating the at least a portion of the virtual map from the local sensors.

5. The vehicle of claim 4, wherein the first processing resources exceed the second processing resources.

6. The vehicle of claim 5, wherein the processing resources comprise a generation frequency, such that when applying the first processing resources, the processors generate the at least a portion of the virtual map at a first frequency and when applying the second processing resources, the processors generate the at least a portion of the virtual map at a second, lower frequency.

7. The vehicle of claim 1, wherein the report comprises coordinates of a zone and a rule of the zone.

8. The vehicle of claim 7, wherein the rule of the zone is a maximum acceleration and the processors are configured to control the motors based on the maximum acceleration.

9. The vehicle of claim 7, wherein the rule of the zone is a forbidden steering maneuver and the processors are configured to prevent the steering from executing the forbidden steering maneuver when the vehicle is detected to be in the zone.

10. The vehicle of claim 9, wherein the processors are configured to: enable the forbidden steering maneuver when the vehicle is detected to be outside of the zone.

11. The vehicle of claim 1, wherein the report comprises a marked unit and wherein the processors are configured to: detect the mark and based on the detection, ignore the unit.

12. The vehicle of claim 11, wherein the report comprises an unmarked unit and wherein the processors are configured to generate the virtual map based on the unmarked unit.

13. The vehicle of claim 1, wherein the processors are configured to: receive a plurality of reports from a plurality of external entities, statistically compare the plurality of reports, and identify an outlying report based on the statistical comparison.

14. The vehicle of claim 13, wherein the processors are configured to: compare timestamps of the plurality of reports and select reports for the statistical comparison based on the comparison of the timestamps.

15. The vehicle of claim 13, wherein the processors are configured to: instruct the external entity responsible for the outlying report to mark future reports.

16. The vehicle of claim 15, wherein the processors are configured to: ignore marked reports.

17. The vehicle of claim 13, wherein the statistical comparison of the plurality of reports comprises statistical comparison of only selected portions of the plurality of reports.

18. The vehicle of claim 1, wherein the report comprises a marking frequency and the processors are configured to generate the virtual map based on the marking frequency.

19. A vehicle comprising:
    motor(s) steering;
    motors;
    local sensors; and
    processor(s) processors configured to:
    execute, via the motors and the steering, a plurality of driving maneuvers;
    generate a virtual map based on the local sensors;
    receive a plurality of reports from a plurality of external entities, statistically compare the plurality of reports, and identify an outlying report based on the statistical comparison;
    instruct the external entity responsible for the outlying report to mark future reports;
    ignore marked reports;
    generate the virtual map based on unmarked reports; and
    restrict at least one of the plurality of driving maneuvers based on one or more of the plurality of reports.

20. A vehicle comprising:
    motor(s) steering;
    motors;
    local sensors; and
    processor(s) processors configured to:
    execute, via the motors and the steering, a plurality of driving maneuvers;
    generate a virtual map based on the local sensors;
    receive a plurality of reports from a plurality of external entities, statistically compare the plurality of reports, and identify an outlying report based on the statistical comparison;
    instruct the external entity responsible for the outlying report to mark future reports;
    ignore marked reports;
    generate the virtual map based on unmarked reports;
    reallocate virtual map processing resources based on unmarked reports; and
    restrict at least one of the plurality of driving maneuvers based on one or more of the plurality of reports.

* * * * *